(12) United States Patent
Fujiwara et al.

(10) Patent No.: US 12,354,489 B2
(45) Date of Patent: Jul. 8, 2025

(54) INFORMATION PROCESSING APPARATUS, METHOD, AND NON-TRANSITORY COMPUTER READABLE MEDIUM

(71) Applicant: TOYOTA JIDOSHA KABUSHIKI KAISHA, Aichi-ken (JP)

(72) Inventors: Ryotaro Fujiwara, Tokyo-to (JP); Hirotada Nakanishi, Toyota (JP); Fuhito Kodama, Nagoya (JP); Yuki Uchida, Iwakura (JP); Satoshi Komamine, Nagoya (JP); Yoshinori Okada, Okazaki (JP); Satoshi Hirano, Obu (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 186 days.

(21) Appl. No.: 18/455,628

(22) Filed: Aug. 25, 2023

(65) Prior Publication Data
US 2024/0071237 A1 Feb. 29, 2024

(30) Foreign Application Priority Data
Aug. 26, 2022 (JP) ................. 2022-135346

(51) Int. Cl.
| | |
|---|---|
| *G08G 5/76* | (2025.01) |
| *B64U 10/10* | (2023.01) |
| *G08G 5/55* | (2025.01) |
| *G08G 5/57* | (2025.01) |
| *B64U 101/40* | (2023.01) |
| *B64U 101/45* | (2023.01) |

(52) U.S. Cl.
CPC ............... *G08G 5/76* (2025.01); *B64U 10/10* (2023.01); *G08G 5/55* (2025.01); *G08G 5/57* (2025.01); *B64U 2101/40* (2023.01); *B64U 2101/45* (2023.01); *B64U 2201/10* (2023.01)

(58) Field of Classification Search
CPC ... G08G 5/76; G08G 5/57; G08G 5/55; B64U 10/10; B64U 2201/10; B64U 2101/45; B64U 2101/40
See application file for complete search history.

(56) References Cited

U.S. PATENT DOCUMENTS

| | | | |
|---|---|---|---|
| 11,163,321 B1* | 11/2021 | Tang | G06N 3/045 |
| 2019/0106212 A1* | 4/2019 | Furukawa | B65H 75/4484 |
| 2019/0159444 A1* | 5/2019 | Schwartz | G05D 1/101 |
| 2019/0382116 A1* | 12/2019 | Yanagishita | A01M 7/00 |
| 2021/0300549 A1* | 9/2021 | Beloussov | B64D 47/02 |
| 2022/0147066 A1* | 5/2022 | Choi | G05D 1/00 |
| 2022/0247347 A1* | 8/2022 | Gavrilov | G05D 1/0038 |
| 2022/0340277 A1* | 10/2022 | Faers | B64D 47/00 |
| 2024/0326073 A1* | 10/2024 | Crowley | B64D 1/18 |

FOREIGN PATENT DOCUMENTS

WO 2021/140657 A1 7/2021

* cited by examiner

*Primary Examiner* — Hussein Elchanti
(74) *Attorney, Agent, or Firm* — HAUPTMAN HAM, LLP

(57) ABSTRACT

An information processing apparatus includes a controller configured to predict a scattering range of a chemical to be sprayed onto a field by a first unmanned aircraft and control, in a case in which it is determined that the chemical will scatter near the field based on the scattering range, a three-dimensional position or a travel route of a second unmanned aircraft so that downwash of the second unmanned aircraft prevents scattering of the chemical near the field.

20 Claims, 9 Drawing Sheets

FIG. 5

```
                    START
                      │
                      ▼
        ┌──────────────────────────────┐
        │ SCATTERING RANGE PREDICTION  │──── S100
        └──────────────────────────────┘
                      │
                      ▼
              ╱─────────────╲
       No    ╱               ╲     S101
      ◄─────⟨ WILL CHEMICAL    ⟩
            ╲ SCATTER NEAR     ╱
             ╲ FIELD?         ╱
              ╲──────────────╱
                      │ Yes
                      ▼
        ┌──────────────────────────────────────┐
        │ CONTROL THREE-DIMENSIONAL POSITION OR│──── S102
        │ TRAVEL PATH OF SECOND UNMANNED AIRCRAFT│
        └──────────────────────────────────────┘
                      │
                      ▼
                    END
```

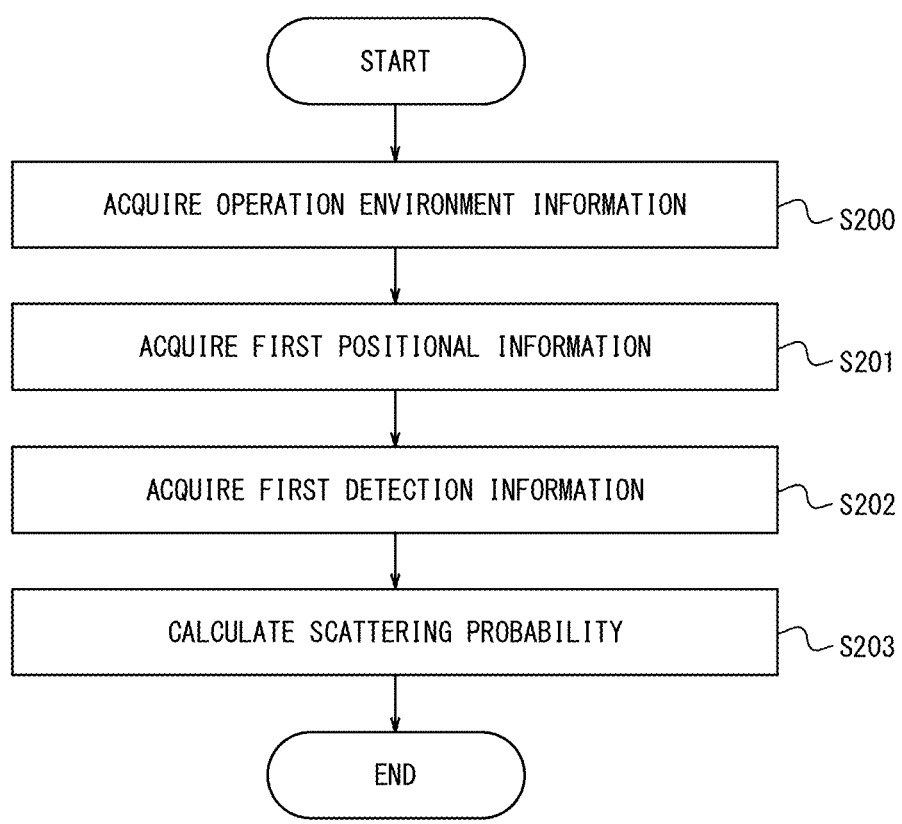

INFORMATION PROCESSING APPARATUS, METHOD, AND NON-TRANSITORY COMPUTER READABLE MEDIUM

CROSS-REFERENCE TO RELATED APPLICATION

This application claims priority to Japanese Patent Application No. 2022-135346 filed on Aug. 26, 2022, the entire contents of which are incorporated herein by reference.

TECHNICAL FIELD

The present disclosure relates to an information processing apparatus, a method, and a non-transitory computer readable medium.

BACKGROUND

Technology related to pest/weed control in fields using unmanned aircraft, such as drones, is known. For example, Patent Literature (PTL) 1 discloses technology related to a drone system that controls the flight altitude on an edge route of a field to be lower than the flight altitude on a central route.

CITATION LIST

Patent Literature

PTL 1: WO 2021/140657 A1

SUMMARY

Conventional technology is for controlling the unmanned aircraft itself, which aerially sprays chemicals, and is unable to sufficiently reduce the risk of adverse effects in areas near the field due to the sprayed chemical scattering outside the field (so-called drift). Conventional technology thus has room for improvement.

It would be helpful to improve technology related to pest/weed control in fields using unmanned aircraft.

An information processing apparatus according to an embodiment of the present disclosure is an information processing apparatus including a controller configured to:
predict a scattering range of a chemical to be sprayed onto a field by a first unmanned aircraft; and
control, in a case in which it is determined that the chemical will scatter near the field based on the scattering range, a three-dimensional position or a travel route of at least one second unmanned aircraft so that downwash of the second unmanned aircraft prevents scattering of the chemical near the field.

A method according to an embodiment of the present disclosure is a method to be executed by an information processing apparatus, the method including:
predicting a scattering range of a chemical to be sprayed onto a field by a first unmanned aircraft; and
controlling, in a case in which it is determined that the chemical will scatter near the field based on the scattering range, a three-dimensional position or a travel route of at least one second unmanned aircraft so that downwash of the second unmanned aircraft prevents scattering of the chemical near the field.

A non-transitory computer readable medium according to an embodiment of the present disclosure is a non-transitory computer readable medium storing a program configured to cause an information processing apparatus to execute operations, the operations including:
predicting a scattering range of a chemical to be sprayed onto a field by a first unmanned aircraft; and
controlling, in a case in which it is determined that the chemical will scatter near the field based on the scattering range, a three-dimensional position or a travel route of a second unmanned aircraft so that downwash of the second unmanned aircraft prevents scattering of the chemical near the field.

According to an embodiment of the present disclosure, technology related to pest/weed control in fields using unmanned aircraft is improved.

BRIEF DESCRIPTION OF THE DRAWINGS

In the accompanying drawings:

FIG. 5 is a flowchart illustrating operations of the information processing apparatus;

FIG. 6 is a flowchart illustrating an example of a processing procedure for scattering range prediction;

DETAILED DESCRIPTION

Hereinafter, an embodiment of the present disclosure will be described.

Outline of Embodiment

Figure 1:
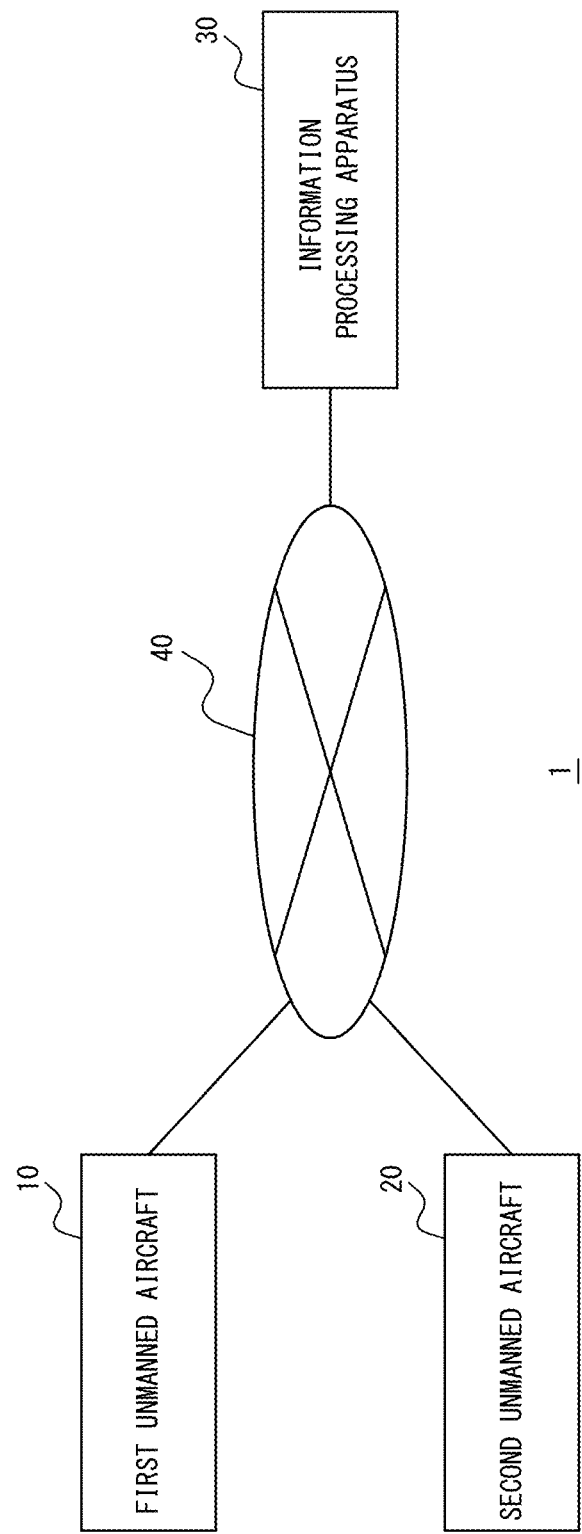
FIG. 1 is a block diagram illustrating a schematic configuration of a system according to an embodiment of the present disclosure.

An outline of a system 1 according to an embodiment of the present disclosure will be described with reference to FIG. 1. The system 1 includes a first unmanned aircraft 10, a second unmanned aircraft 20, and an information processing apparatus 30. The first unmanned aircraft 10, the second unmanned aircraft 20, and the information processing apparatus 30 are communicably connected to a network 40 including, for example, the Internet, a mobile communication network, and the like.

The first unmanned aircraft 10 is any aircraft without a person on board. For example, an unmanned aircraft such as a drone or a multicopter can be employed as the first unmanned aircraft 10. The first unmanned aircraft 10 can proceed or remain stationary (for example, hover) along a predetermined travel route over a field or over the area near a field by autonomous flight or by cooperating with at least one of the second unmanned aircraft 20 and the information processing apparatus 30. The first unmanned aircraft 10 may also be manually piloted by a user of the first unmanned aircraft 10 (for example, a field worker) over at least a portion of the travel route. In the present embodiment, the first unmanned aircraft 10 is used for pest/weed control operations for the field. Pest/weed control operations for the field are carried out by aerial spraying (hereinafter referred to simply as "spraying") of chemicals from the first unmanned aircraft 10 to a spraying area of the field. However, the first unmanned aircraft 10 is not limited to pest/weed control operations and can be used for any operations such as fertilizer application or seeding. The number of first unmanned aircraft 10 included in the system 1 is one in the present embodiment, but the number is not limited to this example and can be freely determined.

The second unmanned aircraft 20 is any aircraft without a person on board. For example, an unmanned aircraft such as a drone or a multicopter can be employed as the second unmanned aircraft 20. The second unmanned aircraft 20 can proceed or remain stationary (for example, hover) along a predetermined travel route over a field or over the area near a field by autonomous flight or by cooperating with at least one of the first unmanned aircraft 10 and the information processing apparatus 30. The second unmanned aircraft 20 may also be manually piloted by a user of the second unmanned aircraft 20 (for example, a field worker) over at least a portion of the travel route. In this case, the user of the second unmanned aircraft 20 may be the same as or different from the user of the first unmanned aircraft 10. In the present embodiment, the second unmanned aircraft 20 is used to prevent chemicals sprayed by the first unmanned aircraft 10 from scattering outside the field. While the role of the first unmanned aircraft 10 is pest/weed control of the field itself, the role of the second unmanned aircraft 20 is to protect areas near the field (for example, other fields, residential areas, or public facilities) from adverse effects due to scattering, outside the field, of the chemicals sprayed on the field by the first unmanned aircraft 10 (hereinafter also referred to as "drift"). In the following, each area in which scattering of the chemical is to be prevented among areas near the field (i.e., the area to be protected by the second unmanned aircraft 20) is also referred to as a "protected area", and each remaining area as an "unprotected area". The number of second unmanned aircraft 20 included in the system 1 is one in the present embodiment, but the number is not limited to this example and can be freely determined.

The information processing apparatus 30 is, for example, a computer such as a server apparatus. The information processing apparatus 30 can communicate with the first unmanned aircraft 10 and the second unmanned aircraft 20 via the network 40.

First, an outline of the present embodiment will be described, and details thereof will be described later. The information processing apparatus predicts the scattering range of the chemical to be sprayed over the field by the first unmanned aircraft 10. In a case in which it is determined that the chemical will scatter near the field based on the scattering range, the information processing apparatus 30 controls the three-dimensional position or the travel route of the second unmanned aircraft 20 so that downwash of the second unmanned aircraft 20 prevents scattering of the chemical near the field.

In this way, according to the present embodiment, the second unmanned aircraft 20 is disposed at a three-dimensional position or travel route that prevents scattering of the chemical near the field. Use of the downwash of the second unmanned aircraft 20 disposed in this manner facilitates a reduction in the risk that the chemical sprayed on the field by the first unmanned aircraft 10 will scatter near the field. In addition, the first unmanned aircraft 10, which performs the pest/weed control operations, can more easily concentrate on the pest/weed control operations, since the presence of the second unmanned aircraft 20 makes interruption of the chemical spraying less likely. Technology related to pest/weed control in fields using unmanned aircraft is therefore improved in that the risk of the adverse effects of drift near the field is reduced, and the efficiency of pest/weed control operations in the field can be easily increased.

Next, configurations of the system 1 will be described in detail.

<Configuration of First Unmanned Aircraft>

Figure 2:
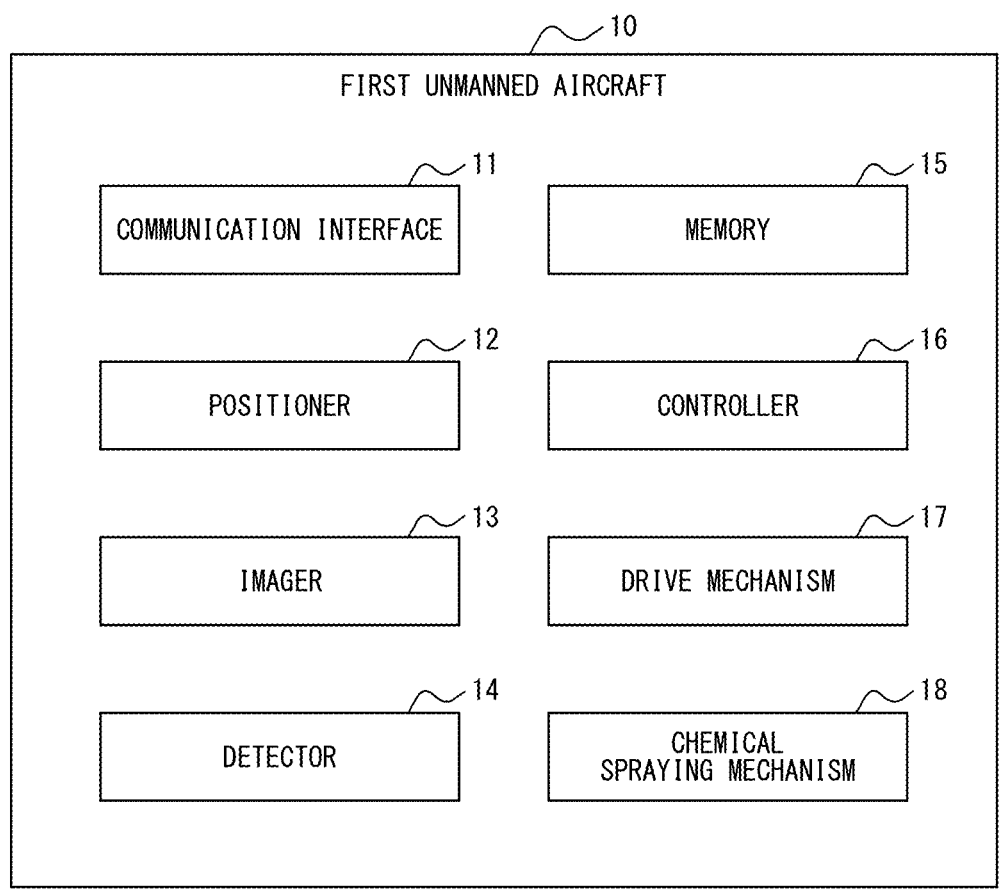
FIG. 2 is a block diagram illustrating a schematic configuration of a first unmanned aircraft.

As illustrated in FIG. 2, the first unmanned aircraft 10 includes a communication interface 11, a positioner 12, an imager 13, a detector 14, a memory 15, a controller 16, a drive mechanism 17, and a chemical spraying mechanism 18.

The communication interface 11 includes at least one communication interface for connecting to the network 40. The communication interface is compliant with mobile communication standards such as the 4th generation (4G) standard or the 5th generation (5G) standard, for example, but these examples are not limiting. For example, the communication interface may include an interface compliant with a short-range wireless communication standard such as Bluetooth® (Bluetooth is a registered trademark in Japan, other countries, or both) or Wi-Fi® (Wi-Fi is a registered trademark in Japan, other countries, or both). In the present embodiment, the first unmanned aircraft 10 can communicate with the second unmanned aircraft 20 and the information processing apparatus 30 via the communication interface 11 and the network 40. The first unmanned aircraft 10 can also communicate directly with the second unmanned aircraft 20 via the communication interface 11 and short-range wireless communication.

The positioner 12 includes one or more apparatuses configured to acquire positional information for the first unmanned aircraft 10. Specifically, the positioner 12 includes a receiver compliant with the Global Positioning System (GPS), for example, but is not limited to this and may include a receiver compliant with any appropriate satellite positioning system. The first unmanned aircraft 10 can acquire its own positional information (hereinafter also referred to as "first positional information") using the positioner 12. The first positional information can include absolute positional information such as three-dimensional coordinate data including the latitude, longitude, and altitude of the first unmanned aircraft 10; relative positional information indicating the positional relationship between the first unmanned aircraft 10 and the second unmanned aircraft 20 by distance, direction, or the like; or both absolute and relative positional information.

The imager 13 includes one or more cameras. Each camera included in the imager 13 is a so-called digital camera that has an imaging element such as a charge coupled device (CCD) or a complementary metal oxide semiconductor (CMOS) image sensor. The imager 13 captures an image of a subject at a predetermined frame rate and outputs image data of the resulting captured image. The image data obtained via the imager 13 can constitute a moving image as a frame image. In an embodiment, the imager 13 can capture images of the surroundings of the first unmanned aircraft 10. The imager 13 is also used for detecting obstacles present around the first unmanned aircraft 10. As the imager 13, a camera having a certain angle of view or an omnidirectional camera can, for example, be employed.

The detector 14 includes various sensors, such as a gyro sensor, a geomagnetic sensor, an acceleration sensor, an angular velocity sensor, a ground altitude sensor, a wind speed and direction sensor, an air pressure sensor, and a chemical sensor. In the present embodiment, the first unmanned aircraft 10 can use the detector 14 to acquire information indicating the direction faced, the inclination, and the altitude of the first unmanned aircraft 10, the ambient wind direction and wind speed, the ambient air pressure, and whether a chemical is adhered to the first unmanned aircraft 10 (hereinafter also referred to as "first detection information").

The memory 15 includes one or more memories. The memories are semiconductor memories, magnetic memories, optical memories, or the like, for example, but are not limited to these. The memories included in the memory 15 may each function as, for example, a main memory, an auxiliary memory, or a cache memory. The memory 15 stores any information used for operations of the first unmanned aircraft 10. For example, the memory 15 may store a system program, an application program, embedded software, map information, or the like. The information stored in the memory 15 may be updated with, for example, information acquired from the network 40 via the communication interface 11.

The controller 16 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 16 controls the operations of the entire first unmanned aircraft 10.

In the present embodiment, the controller 16 receives a pest/weed control operation plan from the information processing apparatus 30 via the communication interface 11 and the network 40. The "pest/weed control operation plan" refers to information indicating the details of the pest/weed control operation, such as the positional information for the field targeted for pest/weed control, the chemical spraying area, the operation start time, the travel route of the first unmanned aircraft 10, and related positional information. The positional information for the field includes two-dimensional coordinate data including latitude and longitude in the present embodiment but may include three-dimensional coordinate data that includes altitude in addition to latitude and longitude. However, the pest/weed control operation plan is not limited to these examples and can include any appropriate data. The controller 16 may store the received pest/weed control operation plan in the memory 15. The controller 16 moves the first unmanned aircraft 10 according to the travel route indicated in the pest/weed control operation plan. The controller 16 controls the drive mechanism 17, described below, to autonomously maintain the flight state of the first unmanned aircraft 10. For example, the controller 16 maintains a predetermined distance from the ground. In a case in which the position of the first unmanned aircraft 10 deviates from a stationary position or from the route due to an external factor, such as wind, the controller 16 controls the drive mechanism so as to return to the route. If an unexpected obstacle is detected, the controller 16 may control the drive mechanism 17 to avoid the obstacle. In the present embodiment, the controller 16 can perform at least a portion of the control of the drive mechanism 17 according to instructions from the information processing apparatus 30.

Figure 8:
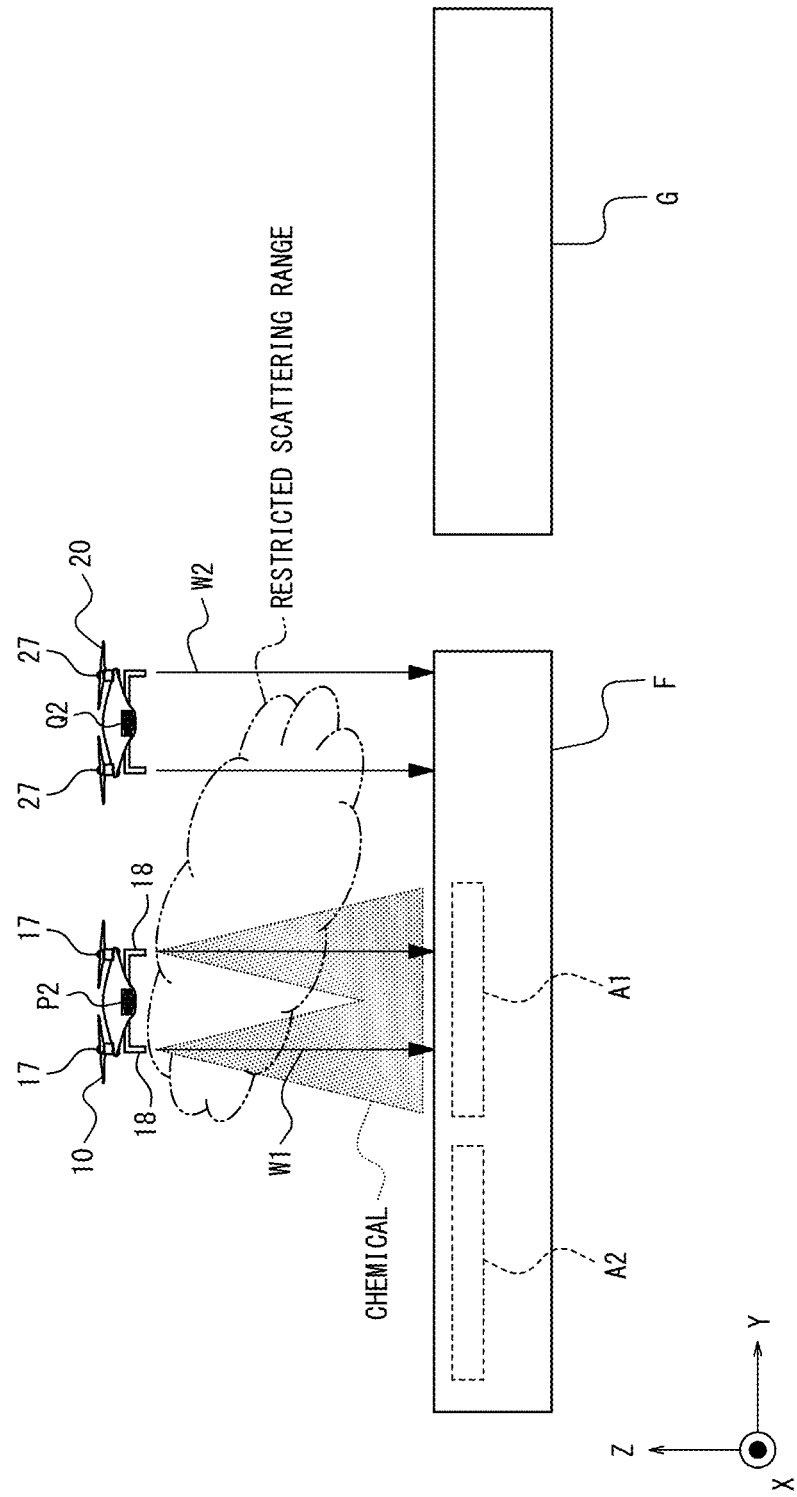
FIG. 8 is a diagram illustrating an example of deployment of the first unmanned aircraft and the second unmanned aircraft according to the present embodiment, as viewed from the X-axis direction.

The drive mechanism 17 is a mechanism for moving the first unmanned aircraft 10 and includes a plurality of rotor blades and a drive apparatus for each rotor blade. The number of rotor blades is four in the present embodiment, but the number is not limited to this and may be six or eight, for example. For example, the plurality of rotor blades is radially arranged in a horizontal plane about the center of the body of the first unmanned aircraft 10. The drive mechanism 17 can cause the first unmanned aircraft 10 to perform various operations, such as remaining stationary, ascending, descending, advancing, retracting, or turning, by adjusting the respective rotational speeds of the rotary wings under the control of the controller 16. The first unmanned aircraft 10 is configured to form a downwash (hereinafter also referred to as "first downwash") by rotation of the rotor blades of the drive mechanism 17. For example, the first unmanned aircraft 10 can be configured to form a first downwash W1, which is a vertically downward (here, downward in the Z-direction) airflow as illustrated in FIG. 8. In the present embodiment, the control of the drive mechanism 17 can be performed by the controller 16 alone, or in accordance with instructions from the information processing apparatus 30.

The chemical spraying mechanism 18 is equipped with a tank filled with a chemical and a plurality of nozzles that discharge the chemical that fills the tank. Each nozzle is installed directly below a corresponding rotor blade so that the chemical discharged from the nozzle is blown down by the first downwash formed by the rotor blades of the drive mechanism 17. In this way, the first unmanned aircraft 10 uses the first downwash formed by the rotor blades of the drive mechanism 17 to spray the chemical discharged from the chemical spraying mechanism 18 onto the spraying area of the field, thereby performing pest/weed control operations.

<Configuration of Second Unmanned Aircraft>

Figure 3:
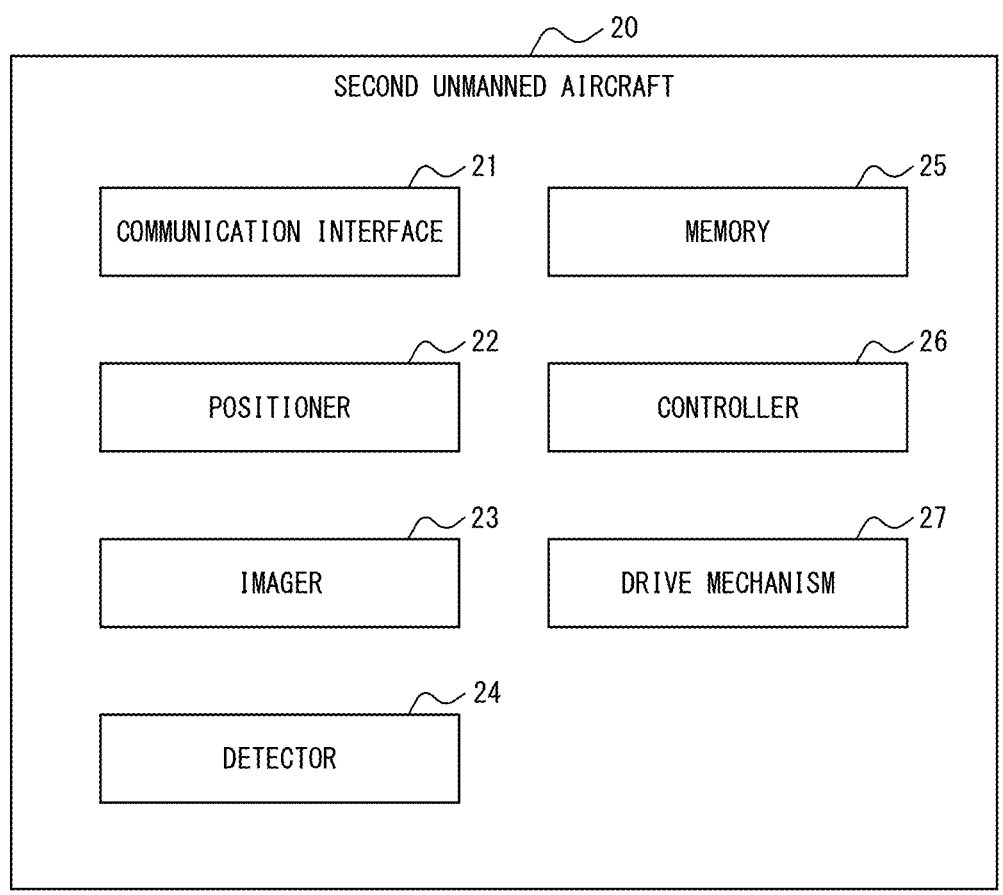
FIG. 3 is a block diagram illustrating a schematic configuration of a second unmanned aircraft.

As illustrated in FIG. 3, the second unmanned aircraft 20 includes a communication interface 21, a positioner 22, an imager 23, a detector 24, a memory 25, a controller 26, and a drive mechanism 27.

The communication interface 21 includes at least one communication interface for connecting to the network 40. The communication interface is compliant with a mobile communication standard such as 4G or 5G, for example, but is not limited to these. For example, the communication interface may include an interface compliant with a short-range wireless communication standard such as Bluetooth® or Wi-Fi®. In the present embodiment, the second unmanned aircraft 20 can communicate with the first unmanned aircraft 10 and the information processing apparatus 30 via the communication interface 21 and the network 40. The second unmanned aircraft 20 can also communicate directly with the first unmanned aircraft 10 via the communication interface 21 and short-range wireless communication.

The positioner 22 includes one or more apparatuses configured to acquire positional information for the second unmanned aircraft 20. Specifically, the positioner 22 includes a receiver compliant with GPS, for example, but is not limited to this and may include a receiver compliant with any appropriate satellite positioning system. The second unmanned aircraft 20 can acquire its own positional information (hereinafter also referred to as "second positional information") using the positioner 22. The second positional information can include absolute positional information such as three-dimensional coordinate data including the latitude, longitude, and altitude of the second unmanned aircraft 20; relative positional information indicating the positional relationship between the second unmanned aircraft and the first unmanned aircraft 10 by distance, direction, or the like; or both absolute and relative positional information.

The imager 23 includes one or more cameras. Each camera included in the imager 23 is a so-called digital camera that has an imaging element such as a CCD or a CMOS image sensor. The imager 23 captures an image of a subject at a predetermined frame rate and outputs image data of the resulting captured image. The image data obtained via the imager 23 can constitute a moving image as a frame image. In an embodiment, the imager 23 can capture images of the surroundings of the second unmanned aircraft 20. The imager 23 is also used for detecting obstacles present around the second unmanned aircraft 20. As the imager 23, a camera having a certain angle of view or an omnidirectional camera can, for example, be employed.

The detector 24 includes various sensors, such as a gyro sensor, a geomagnetic sensor, an acceleration sensor, an angular velocity sensor, a wind speed and direction sensor, a ground altitude sensor, an air pressure sensor, and a chemical sensor. In the present embodiment, the second unmanned aircraft 20 can use the detector 24 to acquire information indicating the direction faced, the inclination, and the altitude of the second unmanned aircraft 20, the ambient wind direction and wind speed, the ambient air pressure, and whether a chemical is adhered to the second unmanned aircraft (hereinafter also referred to as "second detection information").

The memory 25 includes one or more memories. The memories are semiconductor memories, magnetic memories, optical memories, or the like, for example, but are not limited to these. The memories included in the memory 25 may each function as, for example, a main memory, an auxiliary memory, or a cache memory. The memory 25 stores any information used for operations of the second unmanned aircraft 20. For example, the memory 25 may store a system program, an application program, embedded software, map information, or the like. The information stored in the memory 25 may be updated with, for example, information acquired from the network 40 via the communication interface 21.

The controller 26 includes at least one processor, at least one programmable circuit, at least one dedicated circuit, or a combination of these. The processor is a general purpose processor such as a CPU or a GPU, or a dedicated processor that is dedicated to specific processing, for example, but is not limited to these. The programmable circuit is an FPGA, for example, but is not limited to this. The dedicated circuit is an ASIC, for example, but is not limited to this. The controller 26 controls the operations of the entire second unmanned aircraft 20.

In the present embodiment, the controller 26 receives a pest/weed control operation plan from the information processing apparatus 30 via the communication interface 21 and the network 40. The content of the pest/weed control operation plan is the same as that received by the first unmanned aircraft 10. In other words, the second unmanned aircraft 20 shares detailed information on pest/weed control operations with the first unmanned aircraft 10. The controller 26 may store the received pest/weed control operation plan in the memory 25. The controller 26 controls the drive mechanism 27, described below, to autonomously maintain the flight state of the second unmanned aircraft 20. For example, the controller 26 maintains a predetermined distance from the ground. In a case in which the position of the second unmanned aircraft 20 deviates from a stationary position or from the route due to an external factor, such as wind, the controller 26 controls the drive mechanism 27, described below, so as to return to the route. If an unexpected obstacle is detected, the controller 26 may control the drive mechanism 27 to avoid the obstacle. In the present embodiment, the controller 26 can perform at least a portion of the control of the drive mechanism 27 according to instructions from the information processing apparatus 30.

The drive mechanism 27 is a mechanism for moving the second unmanned aircraft 20 and includes a plurality of rotor blades and a drive apparatus for each rotor blade. The number of rotor blades is four in the present embodiment, but the number is not limited to this and may be six or eight, for example. For example, the plurality of rotor blades is radially arranged in a horizontal plane about the center of the body of the second unmanned aircraft 20. The drive mechanism 27 can cause the second unmanned aircraft 20 to perform various operations, such as remaining stationary, ascending, descending, advancing, retracting, or turning, by adjusting the respective rotational speeds of the rotary wings under the control of the controller 26. The second unmanned aircraft 20 is configured to form a downwash (hereinafter also referred to as "second downwash") by rotation of the rotor blades of the drive mechanism 27. For example, the second unmanned aircraft 20 can be configured to form a second downwash W2, which is a vertically downward (here, downward in the Z-direction) airflow as illustrated in FIG. 8. In the present embodiment, the control of the drive mechanism 27 can be performed by the controller 26 alone, or in accordance with instructions from the information processing apparatus 30.

<Information Processing Apparatus Configuration>

Figure 4:
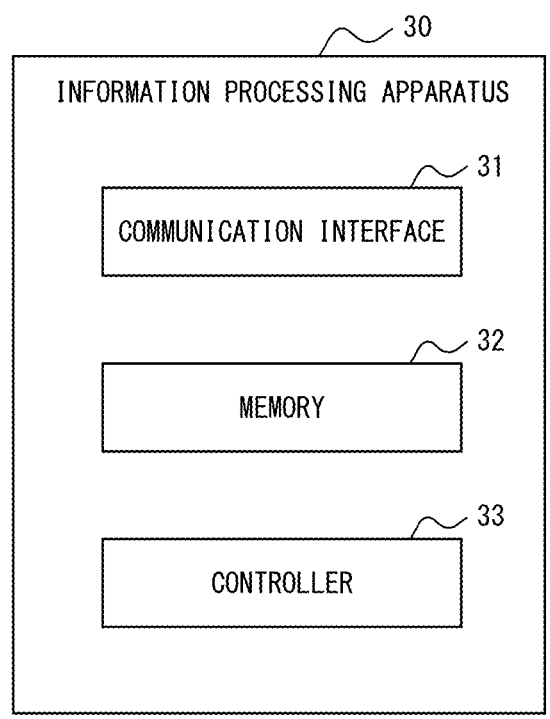
FIG. 4 is a block diagram illustrating a schematic configuration of an information processing apparatus.

As illustrated in FIG. 4, the information processing apparatus 30 includes a communication interface 31, a memory 32, and a controller 33.

The communication interface 31 includes at least one communication interface for connecting to the network 40. The communication interface may be compliant with, for example, mobile communication standards, wired local area network (LAN) standards, or wireless LAN standards, but these examples are not limiting. The communication interface may be compliant with any appropriate communication standards. In the present embodiment, the information processing apparatus 30 can communicate with the first unmanned aircraft 10 and the second unmanned aircraft 20 via the communication interface 31 and the network 40.

The memory 32 includes one or more memories. The memories included in the memory 32 may each function as, for example, a main memory, an auxiliary memory, or a cache memory. The memory 32 stores any information used for operations of the information processing apparatus 30. For example, the memory 32 may store a system program, an application program, a database, map information, information indicating weather conditions, and the like. In the present embodiment, the memory 32 stores data, as weather data, indicating in particular the wind direction, wind speed, air pressure, rainfall, and probability of precipitation in the field as weather conditions in the field where the pest/weed control operations are carried out by the first unmanned aircraft 10. The weather data includes data indicating weather as provided by the Japan Meteorological Agency or weather stations in Japan in the present embodiment, but the weather data is not limited to this example and can include data indicating weather as provided by any source in any area. In addition, the weather data can include not only current information but also historical information. The information stored in the memory 32 may be updated with, for example, information acquired from the network 40 via the communication interface 31.

The controller 33 includes at least one processor, at least one programmable circuit, at least one dedicated circuit, or a combination of these. The controller 33 controls the operations of the entire information processing apparatus 30.

In the present embodiment, the controller 33 generates the above-described pest/weed control operation plan and transmits the generated pest/weed control operation plan to the first unmanned aircraft 10 and the second unmanned aircraft 20 via the communication interface 31 and the network 40. This enables the first unmanned aircraft 10 and the second unmanned aircraft 20 to share the pest/weed control operation plan. The first unmanned aircraft 10 and the second unmanned aircraft 20 may each receive instructions for their own flight plans, instead of sharing the pest/weed control operation plan.

The controller 33 acquires operation environment information and stores the operation environment information in the memory 32. The "operation environment information" is information including information on the field where the pest/weed control operations are to be performed by the first unmanned aircraft 10 (hereinafter also referred to as "field information") and information on the areas located near the field (hereinafter also referred to as "nearby area information"). The field information includes, for example, information indicating the positional information, geometric area, agricultural products, and the like for the field. The nearby area information includes information indicating the positional information, geometric area, distance to the field (for example, distance between boundaries), and impact in the case of the chemical scattering (hereinafter also referred to as "drift severity") for each area located near the field. The drift severity may, for example, be indicated by a score that serves as an evaluation criterion. The score may be a number (for example, an integer from 0 to 100) or a grade (for example, "low", "medium", or "high"). In this case, the score can be calculated according to the pest/weed control operations environment of each area, such as the geographical conditions (e.g., whether the area is a residential area, public facility, or water supply source) or cultivation conditions (e.g., whether the area is another field with crops near harvest time or for organic farming). For example, the score could be calculated to be higher as the impact of the chemical scattering is more severe (for example, as the adverse effect on people or agricultural products is greater).

Any method can be employed to acquire the operation environment information. For example, the information processing apparatus 30 may include an internal or external database that accumulates the field information and the nearby area information, and the controller 33 may acquire the operation environment information by retrieving the necessary information from the database. Alternatively, the controller 33 may acquire the operation environment information by receiving information indicating the location or the like of the field and nearby areas as specified by the user of the first unmanned aircraft 10.

<Flow of Operations of Information Processing Apparatus>

Operations of the information processing apparatus 30 according to the present embodiment will be described with reference to FIG. 5. The operations in FIG. 5 correspond to a method according to the present embodiment. The operations illustrated in FIG. 5 begin at the operation start time indicated in the pest/weed control operation plan in the present embodiment, but this configuration is not limiting. For example, the operations in FIG. 5 may begin at any time specified by the user of the first unmanned aircraft 10 or the second unmanned aircraft 20.

Figure 7:
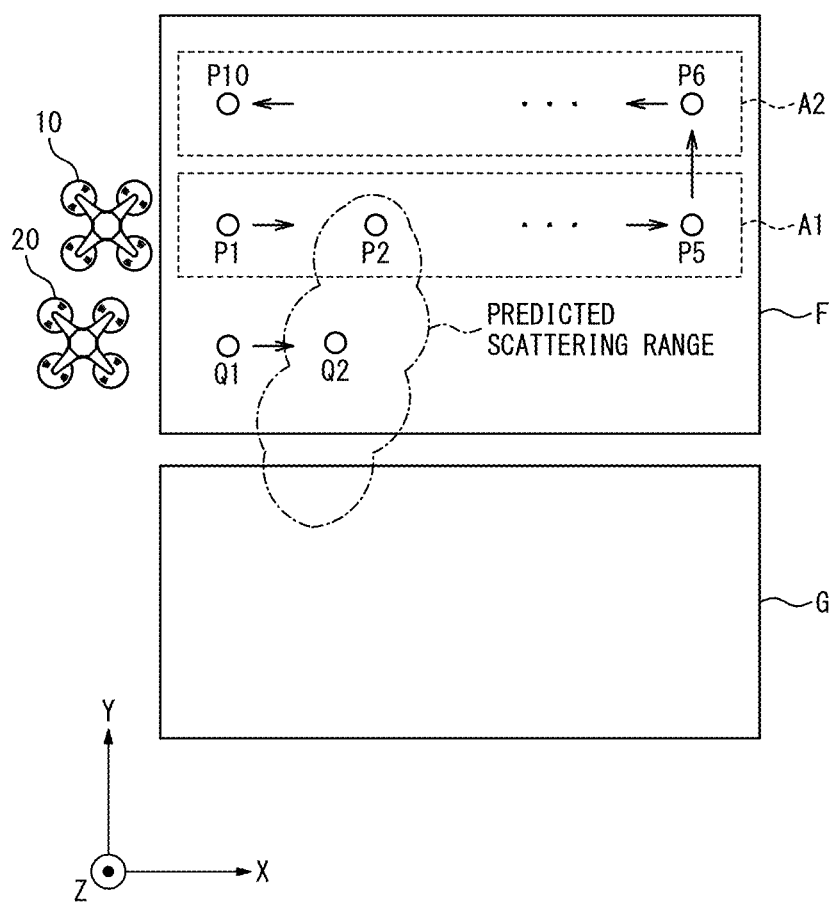
FIG. 7 is a diagram illustrating an example of deployment of the first unmanned aircraft and the second unmanned aircraft according to the present embodiment, as viewed from the Z-axis direction.

The travel routes indicated in the pest/weed control operation plan are described below as being three-dimensional positions P1, . . . , P10, as illustrated in FIG. 7. The first unmanned aircraft 10 performs pest/weed control operations by spraying a chemical in a first spraying area A1 and a second spraying area A2 of a field F while flying along the travel route. Specifically, the first unmanned aircraft 10 moves to the three-dimensional position P1 by the operation start time indicated in the pest/weed control operation plan. The pest/weed control operation in the field F is started when the chemical is sprayed at the three-dimensional position P1 by the first unmanned aircraft 10 at the operation start time. The first unmanned aircraft sprays the chemical over the entire first spraying area A1 while moving in the order of the three-dimensional positions P2, . . . , P5 along the X-direction. After spraying of the chemical at the three-dimensional position P5 is completed, the first unmanned aircraft 10 turns to face the Y-direction and moves to the three-dimensional position P6 to start the pest/weed control operation in the second spraying area A2. The first unmanned aircraft 10 sprays the chemical over the entire second spraying area A2 while moving in the order of the three-dimensional positions P6, . . . , P10 along the X-direction. The pest/weed control operation in the field F is completed upon conclusion of the spraying of the chemical at the three-dimensional position P10.

In the following description, it is assumed that the memory 32 of the information processing apparatus 30 stores a database that accumulates the field information of the field F and nearby area information of each area located near the field F as the operation environment information. The drift severity included in the nearby area information is indicated by a score, as described above, and the score is calculated to be higher as the impact of the chemical scattering is more severe. The controller 33 sets a protected area based on the calculated score. Any appropriate method can be adopted to set the protected area. For example, the controller 33 may extract an area with a score equal to or greater than a predetermined threshold from among a plurality of areas located near the field F and set the extracted area as a protected area by assigning a flag to the extracted area. In this way (here, based on the existence of a flag), the areas located near the field F are classified into protected areas and unprotected areas. In the example illustrated in FIG. 7, one area G adjacent to the field F in the Y-direction (for example, to the south) is set as a protected area, but the number of protected areas is not limited to this example. For example, the four areas on all four sides of the field F may be set as protected areas. The protected areas are not limited to the areas adjacent to the field F. Any neighboring area within a predetermined distance from the boundary of the field F may be set as a protected area.

Step S100: the controller 33 of the information processing apparatus performs scattering range prediction. Scattering range prediction refers to the process of predicting the scattering range of the chemical discharged from the chemical spraying mechanism 18 of the first unmanned aircraft 10. The scattering range identified by the scattering range prediction is hereinafter also referred to as the "predicted scattering range". Based on the predicted scattering range, the controller 33 can predict whether the chemical will scatter into the protected area, and if so, to what location in the protected area.

Specifically, the controller 33 performs the scattering range prediction by executing the operations illustrated in FIG. 6. A specific example of the scattering range prediction is described below with reference to FIG. 6.

Step S200: the controller 33 of the information processing apparatus acquires the operation environment information.

Specifically, the controller 33 acquires the operation environment information by reading the operation environment information from the database stored in the memory 32. As described above, the operation environment information includes field information for the field F and nearby area information for each area located near the field F.

Step S201: the controller 33 acquires the first positional information.

Specifically, the controller 33 acquires the first positional information by repeatedly receiving, from the communication interface 11 of the first unmanned aircraft 10 via the network 40 and the communication interface 31, the positional information for the first unmanned aircraft 10 as acquired via the positioner 12 of the first unmanned aircraft 10. The controller 33 can thereby monitor the positional information for the first unmanned aircraft 10 while the first unmanned aircraft 10 is flying along the travel route.

Step S202: the controller 33 acquires the first detection information.

Specifically, the controller 33 acquires the first detection information by repeatedly receiving, from the communication interface 11 of the first unmanned aircraft 10 via the network 40 and the communication interface 31, information indicating the wind direction, wind speed, and the like around the first unmanned aircraft 10 as acquired via the detector 14. This enables the controller 33 to monitor the status of the first unmanned aircraft 10 and the surroundings of the first unmanned aircraft 10.

Step S203: the controller 33 calculates a scattering probability based on the information acquired in steps S200 through S202.

Specifically, the controller 33 refers to the field information (positional information, geometric area, and the like of the field F) and the nearby area information (positional information, geometric area, distance to the field F, and the like for the protected area) included in the operation environment information acquired in step S200. The controller 33 also refers to the state (three-dimensional position and the like) of the first unmanned aircraft 10 indicated by the first positional information acquired in step S201. Furthermore, the controller 33 refers to the conditions (wind direction, wind speed, and the like) around the first unmanned aircraft 10 indicated by the first detection information acquired in step S202. Based on these pieces of information, the controller 33 calculates the scattering probability of the chemical at each point in the field F, the protected area, and the unprotected area.

The scattering probability is data indicating the amount of the chemical to be sprayed from the first unmanned aircraft 10 that will float or land at a certain location during a predetermined period of time. The scattering probability can, for example, be indicated as a continuous value from 0 to 1 or 0% to 100% in association with each position (for example, three-dimensional or two-dimensional coordinates). Any appropriate method can be adopted to calculate the scattering probability, but the scattering probability may be calculated according to the positional relationship between the first unmanned aircraft 10 and the protected area, and external factors such as wind, at each point in time of spraying. For example, in a case in which, at a certain point in time, the wind direction is such that the chemical is swept in a direction approaching the boundary of the protected area as seen from the first unmanned aircraft 10, the scattering probability can be calculated to be above zero over a wider range of the protected area as the wind speed is greater. In the example illustrated in FIG. 7, in a case in which the travel direction of the first unmanned aircraft 10, i.e. the X-direction, is east, and the wind direction is from the north (the wind blows from the top towards the bottom of the paper), then the wind direction is such that the chemical is swept in the direction approaching the boundary of an area G as seen from the first unmanned aircraft 10. In this case, the scattering probability can be calculated to be above zero over a wider range of the area G, beyond the boundary of the area G from the three-dimensional position of the first unmanned aircraft 10, as the wind speed is greater. In other words, the predicted scattering range, described below, widens.

The wind speed can be any appropriate value, such as at least one of the 10-minute average wind speed, the maximum wind speed (maximum value of 10-minute average wind speed), instantaneous wind speed (3-second average of measurements at 0.25-second intervals), or maximum instantaneous wind speed (maximum value of instantaneous wind speed). The wind direction can be indicated by any direction, such as 16 or 36 directions yielded by dividing the entire circumference into 16 or 36 parts, taking north as a reference.

The controller 33 may also calculate the scattering probability based on the form of the chemical, such as liquid or powder. For example, in a case in which the chemical is a powder, the chemical tends to be more easily scattered, due to external factors such as wind, than a liquid, and the scattering range tends to be more extensive. The controller 33 may therefore calculate the scattering probability when the chemical is a powder to be above zero over a wider range than when the chemical is a liquid.

The scattering probability can be calculated in real time or at predetermined time intervals at each three-dimensional position of the first unmanned aircraft 10 and updated at each three-dimensional position of the first unmanned aircraft 10.

Based on the scattering probability calculated in this way, the controller 33 identifies the positions (for example, three-dimensional coordinates or two-dimensional coordinates) where the scattering probability is greater than zero and determines whether the chemical will scatter into the protected area at each three-dimensional position of the first unmanned aircraft 10. In a case in which scattering is determined to occur, the controller 33 can estimate the location in the protected area where scattering will occur (for example, the three-dimensional coordinates or two-dimensional coordinates). The controller 33 can predict the scattering range based on the estimated positions. Any appropriate method can be adopted to predict the scattering range. For example, the controller 33 may predict the scattering range by estimating the state of the chemical discharged from the nozzles of the chemical spraying mechanism 18 of the first unmanned aircraft 10 based on physical laws or observed data. Alternatively, the controller 33 may construct a prediction model of the scattering range using machine learning such as deep learning, analyze the state of the chemical discharged from the nozzles of the chemical spraying mechanism 18 of the first unmanned aircraft based on the constructed model, and predict the scattering range based on the analysis results.

The description now returns to the flowchart in FIG. 5.

Step S101: the controller 33 determines whether the chemical to be sprayed on the field F by the first unmanned aircraft 10 will scatter near the field F based on the scattering range predicted in step S100 (predicted scattering range). In a case in which it is determined that the chemical will scatter near the field F (step S101: Yes), the process advances to step S102. Conversely, in a case in which it is determined that the chemical will not scatter near the field F (step S101: No), the process ends.

Specifically, the controller 33 determines whether the predicted scattering range at each three-dimensional position of the first unmanned aircraft 10 crosses the boundary of the field F and whether the predicted scattering range extends into the protected area. According to the results of the determination, the controller 33 can determine whether the chemical to be sprayed by the first unmanned aircraft 10 will scatter near the field F at each three-dimensional position. For example, an example of a visualization of the predicted scattering range (dashed-dotted line) is illustrated in FIG. 7. In the example illustrated in FIG. 7, the predicted scattering range at the three-dimensional position P2 of the first unmanned aircraft 10 crosses the boundary of the field F, and the predicted scattering range extends into the area G, which is a protected area. In this case, the controller 33 determines that the chemical to be sprayed by the first unmanned aircraft 10 will scatter near the field F.

Step S102: in a case in which it is determined that the chemical will scatter near the field F (step S101: Yes), the controller 33 controls the three-dimensional position or the travel route of the second unmanned aircraft and disposes the second unmanned aircraft 20 at the optimal position so that the downwash of the second unmanned aircraft 20 prevents scattering of the chemical near the field F. The process then ends.

Although any appropriate method can be employed to control the three-dimensional position or travel route of the second unmanned aircraft 20, first to third examples are illustrated below as specific examples.

In the first example, the controller 33 controls the three-dimensional position or travel route of the second unmanned aircraft 20 based on the three-dimensional position of the first unmanned aircraft 10. Specifically, the controller 33 controls the three-dimensional position or travel route of the second unmanned aircraft 20 so that the three-dimensional position or travel route is included in the predicted scattering range and so that the second unmanned aircraft 20 intervenes between the first unmanned aircraft 10 and the protected area, thereby generating the downwash of the second unmanned aircraft 20 at the desired position. For example, the controller 33 may control the three-dimensional position or the travel route of the second unmanned aircraft 20 for the second unmanned aircraft 20 to move in parallel with the first unmanned aircraft 10 at a predetermined distance from the first unmanned aircraft 10 toward the protected area, which is an area in which scattering of the chemical is to be prevented among areas near the field F. This makes it easier for the second unmanned aircraft 20 to respond immediately to changes in scattering probability, which can be updated in real time at each three-dimensional position of the first unmanned aircraft 10, and to prevent the chemical from entering the protected area using the downwash (second downwash) of the second unmanned aircraft 20, described below.

In the second example, the controller 33 controls the three-dimensional position or travel route of the second unmanned aircraft 20 based on weather conditions of the field F. Specifically, before the pest/weed control operations begin, the controller 33 creates a flight plan for the second unmanned aircraft 20 based on the pest/weed control operation plan (travel route of the first unmanned aircraft 10 and the like) and the weather conditions in the field F on the day of the pest/weed control operations (wind direction and wind speed in the field F and the like) expected from the weather data read from the memory 32. The flight plan of the second unmanned aircraft 20 indicates the three-dimensional position or travel route of the second unmanned aircraft 20 in this example but is not limited in this way and can include any information. The controller 33 transmits the created flight plan to the communication interface 21 of the second unmanned aircraft via the network 40 and the communication interface 31. The controller 26 of the second unmanned aircraft 20 controls the drive mechanism 27 of the second unmanned aircraft 20 for the second unmanned aircraft 20 to move to the three-dimensional position, or fly along the travel route, indicated in the received flight plan.

While the second unmanned aircraft 20 is stationary at the three-dimensional position or flying along the travel route indicated in the flight plan, the controller 33 may make minor adjustments to the flight plan in response to changes in external factors such as the actual wind speed in the field F. For example, the controller 33 may acquire information, from the communication interface 11 of the first unmanned aircraft 10 via the network and the communication interface 31, indicating the wind direction, wind speed, and the like around the first unmanned aircraft 10 as acquired via the detector 14 of the first unmanned aircraft 10. The controller 33 can modify the flight plan of the second unmanned aircraft 20 by analyzing the weather conditions indicated by the acquired information as the weather conditions of the field F. For example, assume that at a certain point in time, the wind speed increases suddenly, and the difference between the scattering range predicted at time T1, when the first unmanned aircraft 10 is moving from three-dimensional position P1 to P2, and the scattering range predicted at time T2, when the first unmanned aircraft 10 arrives at three-dimensional position P2, is equal to or greater than a predetermined threshold. In the example illustrated in FIG. 6, assume that the scattering range is predicted to extend further back (closer to three-dimensional position Q1) in the travel direction (here, the X-direction) of the first unmanned aircraft 10 than the predicted scattering range (dashed-dotted line). In this case, the controller 33 can modify the predicted scattering range and control the second unmanned aircraft 20 at a three-dimensional position yielded by changing the three-dimensional position Q2 of the second unmanned aircraft 20 to be closer to Q1 based on the modified predicted scattering range, thereby generating the downwash of the second unmanned aircraft 20 at the desired position. The controller 33 can then modify the flight plan of the second unmanned aircraft according to the weather conditions of the field F by repeating this process for each three-dimensional position of the first unmanned aircraft 10. In this way, the controller 33 can control the three-dimensional position or travel route of the second unmanned aircraft 20 based on weather conditions of the field F. This facilitates the use of the downwash of the second unmanned aircraft 20, described below, to prevent the chemical from entering the protected area.

In the third example, the controller 33 controls the three-dimensional position or travel route of the second unmanned aircraft 20 based on environmental information indicating the environment near the field F. Specifically, the controller 33 acquires images (or video) of the surroundings of the first unmanned aircraft 10, acquired via the imager 13 of the first unmanned aircraft 10, from the communication interface 11 of the first unmanned aircraft 10 via the network 40 and the communication interface 31. The environmental information may include the conditions downwind of the first unmanned aircraft 10 (hereinafter also referred to as "downwind information"). For example, the downwind information may include information indicating whether protected areas, organisms (such as humans or animals), or obstacles (such as utility poles or flying objects) exist downwind of the first unmanned aircraft 10. The existence of a protected area downwind of the first unmanned aircraft 10 can be determined by the controller 33 analyzing the positional information for the first unmanned aircraft 10 and the map information stored in the memory 32 of the information processing apparatus 30. The existence of organisms or obstacles downwind of the first unmanned aircraft 10 can be determined by the controller 33 analyzing images (or video) downwind of the first unmanned aircraft 10, detected via the imager 13 of the first unmanned aircraft 10, the imager 23 of the second unmanned aircraft 20, or both, as acquired via the network 40, for example. The detection of obstacles may be performed by the first unmanned aircraft 10 or the second unmanned aircraft 20 alone, or by the information processing apparatus 30 upon acquisition of images (or video) from the first unmanned aircraft 10 or the second unmanned aircraft 20 via the network 40. To detect the obstacles, any image recognition method, such as template matching or machine learning, for example, can be employed. The controller 33 can control the three-dimensional position or travel route of the second unmanned aircraft 20 to bypass the detected obstacle, thereby generating the downwash of the second unmanned aircraft 20 at the desired position. In this way, the controller 33 can control the three-dimensional position or travel route of the second unmanned aircraft 20 based on the environmental information. This facilitates the use of the downwash of the second unmanned aircraft 20, described below, to prevent the chemical from entering the protected area.

In the example illustrated in FIG. 7, based on the predicted scattering range at the three-dimensional position P2, it is determined that the three-dimensional position Q2 is the optimal three-dimensional position for preventing entry of the chemical into the area G. In this case, the controller 33 transmits an instruction to move to the three-dimensional position Q2, together with the travel route, via the network 40 to the second unmanned aircraft 20 located at, for example, the three-dimensional position Q1. The second unmanned aircraft 20 moves from the three-dimensional position Q1 to Q2 according to the received instruction and travel route.

In the present embodiment, the controller 33 may control the drive mechanism 27 of the second unmanned aircraft 20 to control the three-dimensional position or the travel route of the second unmanned aircraft for the second unmanned aircraft 20 to move in parallel with the first unmanned aircraft 10 at a predetermined distance from the first unmanned aircraft 10 toward the protected area. This enables the second unmanned aircraft 20 to respond immediately to changes in external factors such as wind, making it easier to prevent the chemical from scattering into the protected area. However, the deployment configuration of the second unmanned aircraft is not limited to this example. For example, in a case in which it is determined, based on the analysis of the weather data, that the chemical cannot scatter into the protected area under the weather conditions for the field F on the day of the pest/weed control operations (for example, equal to or less than a predetermined threshold), the second unmanned aircraft 20 may be placed on standby at the three-dimensional position Q1 during the flight of the first unmanned aircraft 10. In this case, it is easier to reduce the power consumption of the second unmanned aircraft 20.

As described above, the controller 33 can prevent the scattering of the chemical near the field F by generating, at a desired position, a downwash of the second unmanned aircraft 20, whose three-dimensional position or travel route is controlled to prevent the scattering of the chemical near the field F in step S102. For example, the controller 33 controls the drive mechanism 27 of the second unmanned aircraft 20 to form the second downwash W2 as illustrated in FIG. 8. The controller 33 can adjust the strength or direction of the second downwash W2 by controlling the drive mechanism 27. For example, the controller 33 can adjust the intensity of the second downwash W2 relative to the ground by changing the altitude (hovering height or the like) of the second unmanned aircraft 20. As another example, a chemical sensor as the detector 24 may be installed on the top surface of the second unmanned aircraft 20, and in a case in which adhesion of the chemical to the second unmanned aircraft 20 is detected, the controller 33 may control the drive mechanism 27 to increase the altitude of the second unmanned aircraft 20. The controller 33 can also, for example, adjust the direction of the second downwash W2 within a predetermined angular range from the vertical direction by changing the flight speed of the second unmanned aircraft 20. The chemical sprayed from the first unmanned aircraft 10 and scattered from the field F in the direction of the protected area is blown down toward the ground by the vertical downward force (downward in the Z direction in the example in FIG. 7) from the second downwash W2 of the second unmanned aircraft 20. This can restrict the scattering range of the chemical to be within the boundaries of the field F. For example, the scattering range of the chemical can be more restricted than the predicted scattering range at the three-dimensional position P2 identified in FIG. 7, and the scattering range of the chemical can be restricted to within the boundaries of the field F, as illustrated in FIG. 8. Scattering of the chemical near the field F is therefore prevented, facilitating a reduction in the risk of adverse effects, due to drift, on the areas near the field F.

As described above, the information processing apparatus 30 according to the present embodiment predicts the scattering range of the chemical to be sprayed over the field by the first unmanned aircraft 10. In a case in which it is determined that the chemical will scatter near the field based on the scattering range, the information processing apparatus 30 controls the three-dimensional position or the travel route of the second unmanned aircraft 20 so that downwash of the second unmanned aircraft 20 prevents scattering of the chemical near the field.

According to this configuration, the second unmanned aircraft 20 is disposed at a three-dimensional position or travel route that prevents scattering of the chemical near the field. Use of the downwash of the second unmanned aircraft 20 disposed in this manner facilitates a reduction in the risk that the chemical sprayed on the field by the first unmanned aircraft 10 will scatter near the field. In addition, the first unmanned aircraft 10, which performs the pest/weed control operations, can more easily concentrate on the pest/weed control operations, since the presence of the second unmanned aircraft 20 makes interruption of the chemical spraying less likely. Technology related to pest/weed control in fields using unmanned aircraft is therefore improved in that the risk of the adverse effects of drift near the field is reduced, and the efficiency of pest/weed control operations in the field can be easily increased.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, in one variation of the present embodiment, the second unmanned aircraft 20 may be replaced by a plurality of second unmanned aircraft 20. The controller 33 may arrange the plurality of second unmanned aircraft 20 in a row, at three-dimensional positions or travel routes that prevent scattering of the chemical to the protected area and at a predetermined distance from the first unmanned aircraft 10 toward the protected area. In this case, the controller 33 may control the second downwash while keeping the plurality of second unmanned aircraft 20 arranged in a row stationary (for example, hovering) to form a second downwash "wall", thereby preventing the chemical from scattering into the protected area.

Figure 9:
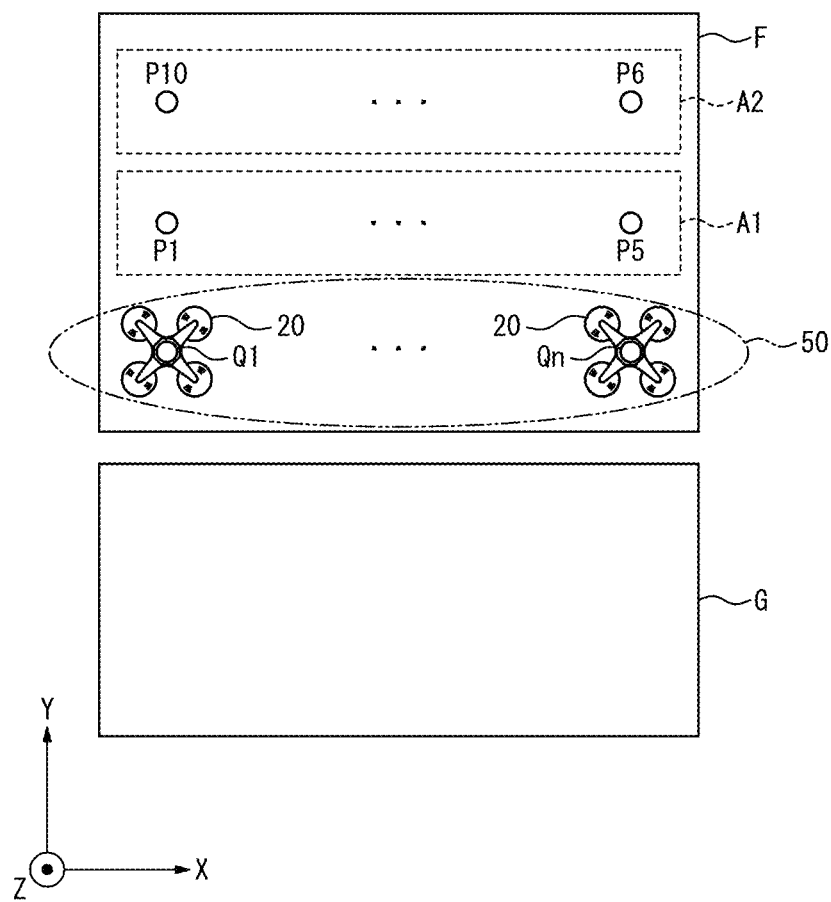
FIG. 9 is a diagram illustrating an example of deployment of the first unmanned aircraft and the second unmanned aircraft according to a variation of the present embodiment, as viewed from the Z-axis direction.

In this variation, the plurality of second unmanned aircraft 20 can be arranged at three-dimensional positions Q1, . . . , Qn as illustrated in FIG. 9 as the three-dimensional positions or travel routes that prevent scattering of the chemical to the protected area at a predetermined distance from the first unmanned aircraft 10 toward the protected area. The number n of three-dimensional positions Q of the second unmanned aircraft 20 is an integer equal to or greater than 2. In a case in which it is determined that the chemical will scatter near the field F (step S101: Yes), the controller 33 arranges the plurality of second unmanned aircraft 20 in a row in step S102, at three-dimensional positions or travel routes that prevent scattering of the chemical to the protected area and at a predetermined distance from the first unmanned aircraft 10 toward the protected area, so that the downwash of the plurality of second unmanned aircraft 20 forms a "wall". In the example illustrated in FIG. 9, the plurality of second unmanned aircraft 20 form a second unmanned aircraft group 50. In a case in which the position of each second unmanned aircraft 20 deviates from a stationary position or from the route due to an external factor, such as wind, the controller 26 of the second unmanned aircraft 20 controls the drive mechanism 27 so as to return to the stationary position or the route. The controller 33 of the information processing apparatus 30 can then use the downwash (second downwash) of the plurality of second unmanned aircraft 20 to prevent the chemical from scattering near the field.

In this way, according to this variation, the second unmanned aircraft group 50 is deployed at three-dimensional positions intervening between the first unmanned aircraft 10 and the protected area. For example, in the case of a high (for example, exceeding a predetermined threshold) risk of widespread chemical scattering to the protected area under the weather conditions of the field F on the day of the pest/weed control operations, one second unmanned aircraft 20 may be insufficient to prevent widespread chemical scattering while the first unmanned aircraft 10 is moving. According to this variation, even in such a case, the second downwash (second downwash wall) of a plurality of second unmanned aircraft 20 can be used to more reliably prevent scattering of the chemical into the protected area. Accordingly, the risk of adverse effects of drift on the areas near the field is further reduced, and increased efficiency of pest/weed control operations for the field is further facilitated.

For example, in the above embodiment, the second unmanned aircraft does not include a chemical spraying mechanism, but in another variation of the present embodiment, the second unmanned aircraft 20 may be equipped with a chemical spraying mechanism similar to the chemical spraying mechanism 18 of the first unmanned aircraft 10. In this case, the controller 33 can control the drive mechanism 27 and the chemical spraying mechanism of the second unmanned aircraft 20 to perform part of the pest/weed control operations by spraying the chemical discharged from the chemical spray mechanism onto the target spraying area in the field F using the second downwash formed by the drive mechanism 27. For example, in a case in which it is determined that the chemical cannot scatter into the protected area under the weather conditions for the field F on the day of the pest/weed control operations, there is little need for the second unmanned aircraft 20 to protect the areas near the field. Under such circumstances, having the second unmanned aircraft 20 assist the first unmanned aircraft 10 in pest/weed control operations will help shorten the time required for the pest/weed control operations.

For example, an embodiment in which the configuration and operations of the information processing apparatus 30 in the above embodiment are distributed to multiple computers capable of communicating with each other can be implemented. For example, an embodiment in which some or all of the components of the information processing apparatus 30 are provided in the first unmanned aircraft 10 or the second unmanned aircraft 20 can also be implemented.

For example, an embodiment in which a general purpose computer functions as the information processing apparatus 30 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus comprising a controller configured to:
predict a scattering range of a chemical to be sprayed onto a field by a first unmanned aircraft; and
control, in a case in which it is determined that the chemical will scatter near the field based on the scattering range, a three-dimensional position or a travel route of at least one second unmanned aircraft so that downwash of the second unmanned aircraft prevents scattering of the chemical near the field.

[Appendix 2] The information processing apparatus according to appendix 1, wherein the controller is configured to control the three-dimensional position or the travel route of the second unmanned aircraft based on a three-dimensional position of the first unmanned aircraft.

[Appendix 3] The information processing apparatus according to appendix 2, wherein the controller is configured to control the three-dimensional position or the travel route of the second unmanned aircraft for the second unmanned aircraft to move in parallel with the first unmanned aircraft at a predetermined distance from the first unmanned aircraft toward a protected area, the protected area being an area in which scattering of the chemical is to be prevented among areas near the field.

[Appendix 4] The information processing apparatus according to any one of appendices 1 to 3, wherein the controller is configured to control the three-dimensional position or the travel route of the second unmanned aircraft based on a weather condition of the field.

[Appendix 5] The information processing apparatus according to any one of appendices 1 to 4, wherein the controller is configured to control the three-dimensional position or the travel route of the second unmanned aircraft based on environmental information indicating an environment near the field.

[Appendix 6] The information processing apparatus according to appendix 5, wherein the environmental information includes a condition downwind of the first unmanned aircraft.

[Appendix 7] The information processing apparatus according to appendix 1 or 2, wherein
the at least one second unmanned aircraft comprises a plurality of second unmanned aircraft, and
the controller is configured to arrange the plurality of second unmanned aircraft in a row, at three-dimensional positions or travel routes that prevent scattering of the chemical near the field and at a predetermined distance from the first unmanned aircraft toward a protected area, the protected area being an area in which scattering of the chemical is to be prevented among areas near the field.

[Appendix 8] A method to be executed by an information processing apparatus, the method comprising:
predicting a scattering range of a chemical to be sprayed onto a field by a first unmanned aircraft; and
controlling, in a case in which it is determined that the chemical will scatter near the field based on the scattering range, a three-dimensional position or a travel route of at least one second unmanned aircraft so that downwash of the second unmanned aircraft prevents scattering of the chemical near the field.

[Appendix 9] The method according to appendix 8, further comprising controlling the three-dimensional position or the travel route of the second unmanned aircraft based on a three-dimensional position of the first unmanned aircraft.

[Appendix 10] The method according to appendix 9, further comprising controlling the three-dimensional position or the travel route of the second unmanned aircraft for the second unmanned aircraft to move in parallel with the first unmanned aircraft at a predetermined distance from the first unmanned aircraft toward a protected area, the protected area being an area in which scattering of the chemical is to be prevented among areas near the field.

[Appendix 11] The method according to any one of appendices 8 to 10, further comprising controlling the three-dimensional position or the travel route of the second unmanned aircraft based on a weather condition of the field.

[Appendix 12] The method according to any one of appendices 8 to 11, further comprising controlling the three-dimensional position or the travel route of the second unmanned aircraft based on environmental information indicating an environment near the field.

[Appendix 13] The method according to appendix 12, wherein the environmental information includes a condition downwind of the first unmanned aircraft.

[Appendix 14] The method according to appendix 8 or 9, wherein the at least one second unmanned aircraft comprises a plurality of second unmanned aircraft, and
the method further comprises arranging the plurality of second unmanned aircraft in a row, at three-dimensional positions or travel routes that prevent scattering of the chemical near the field and at a predetermined distance from the first unmanned aircraft toward a protected area, the protected area being an area in which scattering of the chemical is to be prevented among areas near the field.

[Appendix 15] A non-transitory computer readable medium storing a program configured to cause an information processing apparatus to execute operations, the operations comprising:
predicting a scattering range of a chemical to be sprayed onto a field by a first unmanned aircraft; and
controlling, in a case in which it is determined that the chemical will scatter near the field based on the scattering range, a three-dimensional position or a travel route of a second unmanned aircraft so that downwash of the second unmanned aircraft prevents scattering of the chemical near the field.

[Appendix 16] The non-transitory computer readable medium according to appendix 15, wherein the operations further comprise controlling the three-dimensional position or the travel route of the second unmanned aircraft based on a three-dimensional position of the first unmanned aircraft.

[Appendix 17] The non-transitory computer readable medium according to appendix 16, wherein the operations further comprise controlling the three-dimensional position or the travel route of the second unmanned aircraft for the second unmanned aircraft to move in parallel with the first unmanned aircraft at a predetermined distance from the first unmanned aircraft toward a protected area, the protected area being an area in which scattering of the chemical is to be prevented among areas near the field.

[Appendix 18] The non-transitory computer readable medium according to any one of appendices 15 to 17, wherein the operations further comprise controlling the three-dimensional position or the travel route of the second unmanned aircraft based on a weather condition of the field.

[Appendix 19] The non-transitory computer readable medium according to any one of appendices 15 to 18, wherein the operations further comprise controlling the three-dimensional position or the travel route of the second unmanned aircraft based on environmental information indicating an environment near the field.

[Appendix 20] The non-transitory computer readable medium according to appendix 19, wherein the environmental information includes a condition downwind of the first unmanned aircraft.

The invention claimed is:
1. An information processing apparatus comprising a controller configured to:

predict a scattering range of a chemical to be sprayed onto a field by a first unmanned aircraft; and control, in a case in which it is determined that the chemical will scatter near the field based on the scattering range, a three-dimensional position or a travel route of at least one second unmanned aircraft so that downwash of the second unmanned aircraft prevents scattering of the chemical near the field.

2. The information processing apparatus according to claim 1, wherein the controller is configured to control the three-dimensional position or the travel route of the second unmanned aircraft based on a three-dimensional position of the first unmanned aircraft.

3. The information processing apparatus according to claim 2, wherein the controller is configured to control the three-dimensional position or the travel route of the second unmanned aircraft for the second unmanned aircraft to move in parallel with the first unmanned aircraft at a predetermined distance from the first unmanned aircraft toward a protected area, the protected area being an area in which scattering of the chemical is to be prevented among areas near the field.

4. The information processing apparatus according to claim 1, wherein the controller is configured to control the three-dimensional position or the travel route of the second unmanned aircraft based on a weather condition of the field.

5. The information processing apparatus according to claim 1, wherein the controller is configured to control the three-dimensional position or the travel route of the second unmanned aircraft based on environmental information indicating an environment near the field.

6. The information processing apparatus according to claim 5, wherein the environmental information includes a condition downwind of the first unmanned aircraft.

7. The information processing apparatus according to claim 1, wherein the at least one second unmanned aircraft comprises a plurality of second unmanned aircraft, and the controller is configured to arrange the plurality of second unmanned aircraft in a row, at three-dimensional positions or travel routes that prevent scattering of the chemical near the field and at a predetermined distance from the first unmanned aircraft toward a protected area, the protected area being an area in which scattering of the chemical is to be prevented among areas near the field.

8. A method to be executed by an information processing apparatus, the method comprising:

predicting a scattering range of a chemical to be sprayed onto a field by a first unmanned aircraft; and controlling, in a case in which it is determined that the chemical will scatter near the field based on the scattering range, a three-dimensional position or a travel route of at least one second unmanned aircraft so that downwash of the second unmanned aircraft prevents scattering of the chemical near the field.

9. The method according to claim 8, further comprising controlling the three-dimensional position or the travel route of the second unmanned aircraft based on a three-dimensional position of the first unmanned aircraft.

10. The method according to claim 9, further comprising controlling the three-dimensional position or the travel route of the second unmanned aircraft for the second unmanned aircraft to move in parallel with the first unmanned aircraft at a predetermined distance from the first unmanned aircraft toward a protected area, the protected area being an area in which scattering of the chemical is to be prevented among areas near the field.

11. The method according to claim 8, further comprising controlling the three-dimensional position or the travel route of the second unmanned aircraft based on a weather condition of the field.

12. The method according to claim 8, further comprising controlling the three-dimensional position or the travel route of the second unmanned aircraft based on environmental information indicating an environment near the field.

13. The method according to claim 12, wherein the environmental information includes a condition downwind of the first unmanned aircraft.

14. The method according to claim 8, wherein the at least one second unmanned aircraft comprises a plurality of second unmanned aircraft, and the method further comprises arranging the plurality of second unmanned aircraft in a row, at three-dimensional positions or travel routes that prevent scattering of the chemical near the field and at a predetermined distance from the first unmanned aircraft toward a protected area, the protected area being an area in which scattering of the chemical is to be prevented among areas near the field.

15. A non-transitory computer readable medium storing a program configured to cause an information processing apparatus to execute operations, the operations comprising:

predicting a scattering range of a chemical to be sprayed onto a field by a first unmanned aircraft; and controlling, in a case in which it is determined that the chemical will scatter near the field based on the scattering range, a three-dimensional position or a travel route of a second unmanned aircraft so that downwash of the second unmanned aircraft prevents scattering of the chemical near the field.

16. The non-transitory computer readable medium according to claim 15, wherein the operations further comprise controlling the three-dimensional position or the travel route of the second unmanned aircraft based on a three-dimensional position of the first unmanned aircraft.

17. The non-transitory computer readable medium according to claim 16, wherein the operations further comprise controlling the three-dimensional position or the travel route of the second unmanned aircraft for the second unmanned aircraft to move in parallel with the first unmanned aircraft at a predetermined distance from the first unmanned aircraft toward a protected area, the protected area being an area in which scattering of the chemical is to be prevented among areas near the field.

18. The non-transitory computer readable medium according to claim 15, wherein the operations further comprise controlling the three-dimensional position or the travel route of the second unmanned aircraft based on a weather condition of the field.

19. The non-transitory computer readable medium according to claim 15, wherein the operations further comprise controlling the three-dimensional position or the travel route of the second unmanned aircraft based on environmental information indicating an environment near the field.

20. The non-transitory computer readable medium according to claim 19, wherein the environmental information includes a condition downwind of the first unmanned aircraft.

* * * * *